US008447301B2

(12) United States Patent
Rajkotia

(10) Patent No.: US 8,447,301 B2
(45) Date of Patent: May 21, 2013

(54) APPARATUS AND METHOD FOR IMPROVED HANDOFFS IN AN EV-DV WIRELESS NETWORK

(75) Inventor: Purva R. Rajkotia, Plano, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 658 days.

(21) Appl. No.: 11/033,458

(22) Filed: Jan. 11, 2005

(65) Prior Publication Data

US 2005/0181794 A1   Aug. 18, 2005

Related U.S. Application Data

(60) Provisional application No. 60/543,954, filed on Feb. 12, 2004.

(51) Int. Cl.
*H04W 36/00* (2009.01)

(52) U.S. Cl.
USPC ............................................. 455/436

(58) Field of Classification Search
USPC ............... 455/436–439, 442, 432.1, 443–448
See application file for complete search history.

(56) References Cited

U.S. PATENT DOCUMENTS

| 5,140,627 | A | * | 8/1992 | Dahlin ............................ 455/436 |
| 5,577,022 | A | * | 11/1996 | Padovani et al. ............... 370/332 |
| 2002/0128013 | A1 | * | 9/2002 | Declerck et al. ............... 455/436 |
| 2004/0022265 | A1 | * | 2/2004 | Luz et al. ........................ 370/466 |
| 2004/0058678 | A1 | * | 3/2004 | deTorbal ......................... 455/437 |
| 2004/0063431 | A1 | * | 4/2004 | Julka et al. ..................... 455/436 |
| 2004/0203780 | A1 | * | 10/2004 | Julka et al. ..................... 455/436 |
| 2004/0266434 | A1 | * | 12/2004 | Lehtinen et al. ............... 455/436 |
| 2005/0135316 | A1 | * | 6/2005 | Cromer et al. ................. 370/338 |

* cited by examiner

*Primary Examiner* — Temica M Beamer
*Assistant Examiner* — Joel Ajayi

(57) ABSTRACT

A base station for use in a 1xEV-DV/DO wireless network that communicates with mobile stations in its coverage area. The base station comprises a handoff controller for receiving a Handoff Request message from a first mobile station attempting to hand off to the base station. In response to receipt of the Handoff Request message, the handoff controller determines whether the available resources in the base station exceed a predetermined minimum threshold. If the available resources exceed the predetermined minimum threshold, the handoff controller allows the first mobile station to be handed off to the base station. Otherwise, the handoff controller prevents the first mobile station from being handed off to the base station.

20 Claims, 4 Drawing Sheets

APPARATUS AND METHOD FOR IMPROVED HANDOFFS IN AN EV-DV WIRELESS NETWORK

CROSS-REFERENCE TO RELATED APPLICATION AND CLAIM OF PRIORITY

The present invention is related to that disclosed in U.S. Provisional Patent Application Ser. No. 60/543,954, filed Feb. 12, 2004, entitled "Apparatus and Method for Improved handoffs in an EV-DV Wireless Network". U.S. Provisional Patent Application Ser. No. 60/543,954 is assigned to the assignee of the present application. The subject matter disclosed in U.S. Provisional Patent Application Ser. No. 60/543,954 is hereby incorporated by reference into the present disclosure as if fully set forth herein. The present invention hereby claims priority under 35 U.S.C. §119(e) to U.S. Provisional Patent Application Ser. No. 60/543,954.

TECHNICAL FIELD OF THE INVENTION

The present invention is directed to wireless networks and, more specifically, to an improved method of performing handoffs in a 1xEV-DV wireless network.

BACKGROUND OF THE INVENTION

Businesses and consumers use a wide variety of fixed and mobile wireless terminals, including cell phones, pagers, Personal Communication Services (PCS) systems, and fixed wireless access devices (e.g., vending machine with cell phone capability). Wireless service providers continually try to create new markets for wireless devices and expand existing markets by making wireless devices and services cheaper and more reliable. As part of this effort, wireless service providers are implementing new services, especially digital data services that, for example, enable a user (or subscriber) to browse the Internet and to send and receive e-mail.

Digital services are provided in 1xEV-DV and 1xEV-D0 wireless networks by means of a packet data channel (PDCH) that transmits packet data to mobile station at a high data rate. To ensure backward compatibility with conventional IS-95 and IS-2000 code division multiple access (CDMA) wireless networks, EV-DV networks support legacy handoff operations in which a source base station controls the handoff of a mobile station from the source base station to a target base station. When the source base station determines that the mobile station should be handed off to the target mobile station, the source bas station transmits a control message to the mobile station to initiate the handoff operation.

However, EV-DV networks also improve upon legacy handoff operations by implementing an autonomous handoff operation that is controlled by the mobile station instead. In a 1xEV-DV/DO network, the mobile station is capable of determining when a handoff is necessary. In response to such a determination, the mobile station transmits a Handoff Request message to the target base station to initiate the handoff operation.

Unfortunately, in a conventional autonomous soft handoff operation, the target base station is not able to reject the cell-switching request from the mobile station. This inability creates problems. Since the mobile station is not aware of the resource availability (e.g., radio channels, signal processors) of the target base station, the mobile station may initiate a handoff operation to an already heavily loaded target base station in which few resources are available. This may result in a failure in the handoff operation. Such a failure may be avoided by reserving more resources at the base station for handoff operations. However, reserving additional resources in this way reduces the overall system capacity for handling calls.

Therefore, there is a need in the art for improved systems and methods for performing handoffs between cells in an EV-DV wireless network. In particular, there is a need for a wireless network that improves the handling of autonomous handoff operations initiated by mobile stations.

SUMMARY OF THE INVENTION

The present invention provides a method for improving the conventional cell-switching (i.e., handoff) operations in EV-DV wireless networks. The present invention may be implemented in any EV-DV system in which the forward packet data channel (F-PDCH) is used. Conventional wireless networks do not enable a target base station to either reject the cell-switching (handoff) request or force the mobile station to retry the request after a delay.

The present invention provides the target base station with the capability of rejecting the mobile station request to initiate a handoff. This forces the mobile station to remain anchored to the source base station for a longer period of time. This reduces the number of handoff failures, while at the same time conserving resources in the target base station for new calls. The present invention also introduces the concept of a retry handoff operation in those cases where the target base station permits the mobile station to retry a handoff operation after some delay period.

To address the above-discussed deficiencies of the prior art, it is a primary object of the present invention to provide a first base station for use in a 1xEV-DV/DO wireless network capable of communicating with a plurality of mobile stations in a coverage area of the 1xEV-DV/DO wireless network. According to an advantageous embodiment of the present invention, the first base station comprises a handoff controller capable of receiving a Handoff Request message from a first mobile station attempting to hand off to the first base station. The handoff controller, in response to receipt of the Handoff Request message, is further capable of determining if an amount of available resources available in the first base station exceeds a predetermined minimum threshold.

According to one embodiment of the present invention, the predetermined minimum threshold is determined by an operator of the 1xEV-DV/DO wireless network.

According to another embodiment of the present invention, the handoff controller, in response to a determination that the amount of available resources exceeds the predetermined minimum threshold, allows the first mobile station to be handed off to the first base station.

According to still another embodiment of the present invention, the handoff controller, in response to a determination that the amount of available resources does not exceed the predetermined minimum threshold, prevents the first mobile station from being handed off to the first base station.

According to yet another embodiment of the present invention, the handoff controller prevents the first mobile station from being handed off to the base station by transmitting a control message to a source base station that is in communication with the first mobile station.

According to a further embodiment of the present invention, the control message indicates to the source base station that insufficient resources are available in the first base station.

According to a still further embodiment of the present invention, the control message further indicates to the source base station a delay time that the first mobile station must wait before again attempting a handoff to the first base station.

According to a yet further embodiment of the present invention, the control message causes the source base station to transmit a Universal Handoff direction message to the first mobile station, wherein the Universal Handoff direction message notifies the first mobile station that insufficient resources are available in the first base station and further notifies the first mobile station of the time delay.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
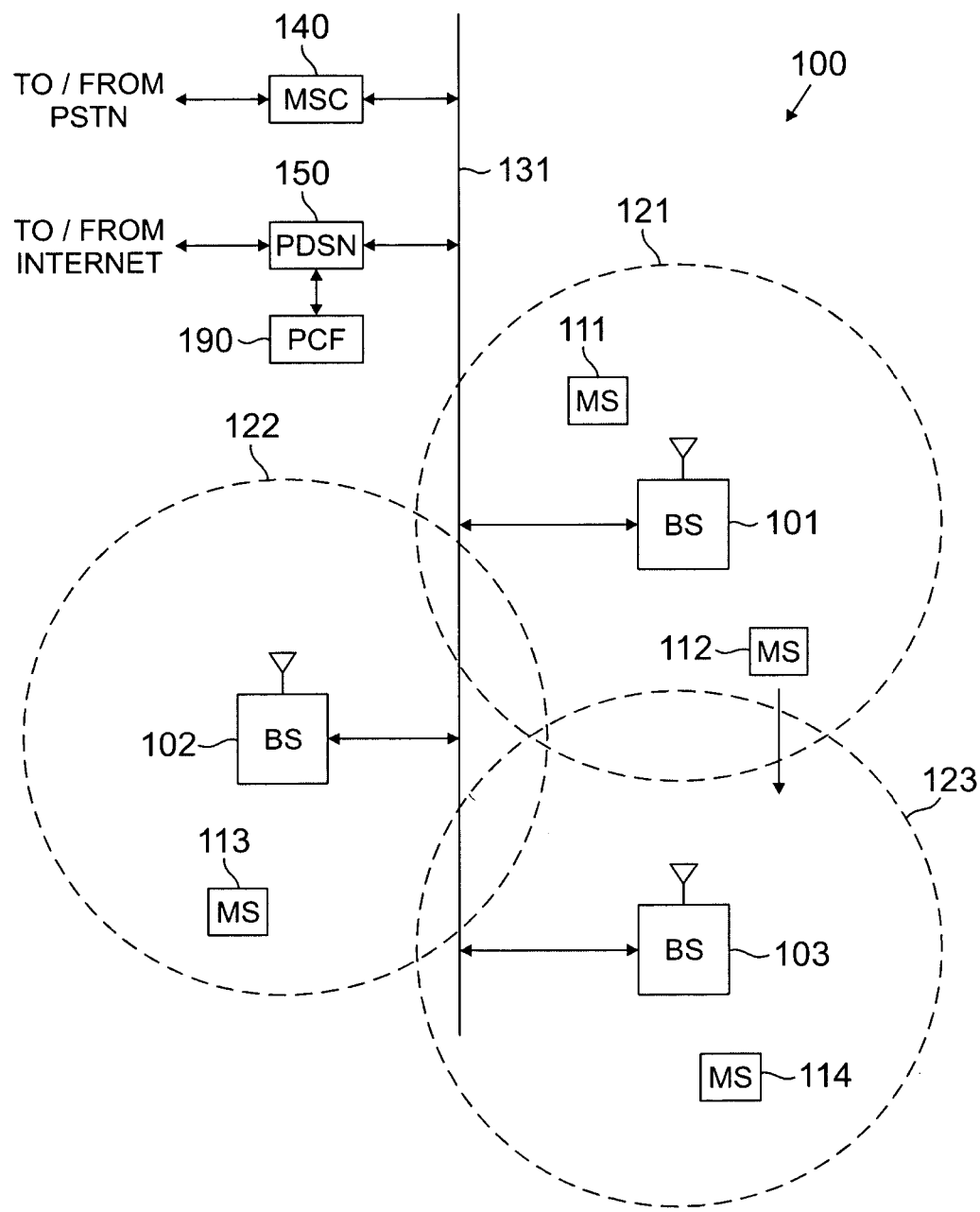
FIG. 1 illustrates an exemplary wireless network that implements an improved handoff algorithm according to the principles of the present invention.

FIG. 1 illustrates exemplary wireless network 100, which implements an improved handoff algorithm according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000-C standard (i.e., Release C of cdma2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a handoff will occur.

As explained above, in a 1xEV-DV/DO wireless network, a mobile station may autonomously initiate a handoff operation from a source (or anchor) base station to a target base station. However, a target base station according to the principles of the present invention is capable of rejecting a Handoff Request message from a mobile station and, optionally, allowing the mobile station to retry the handoff operation after a suitable delay period.

Figure 2:
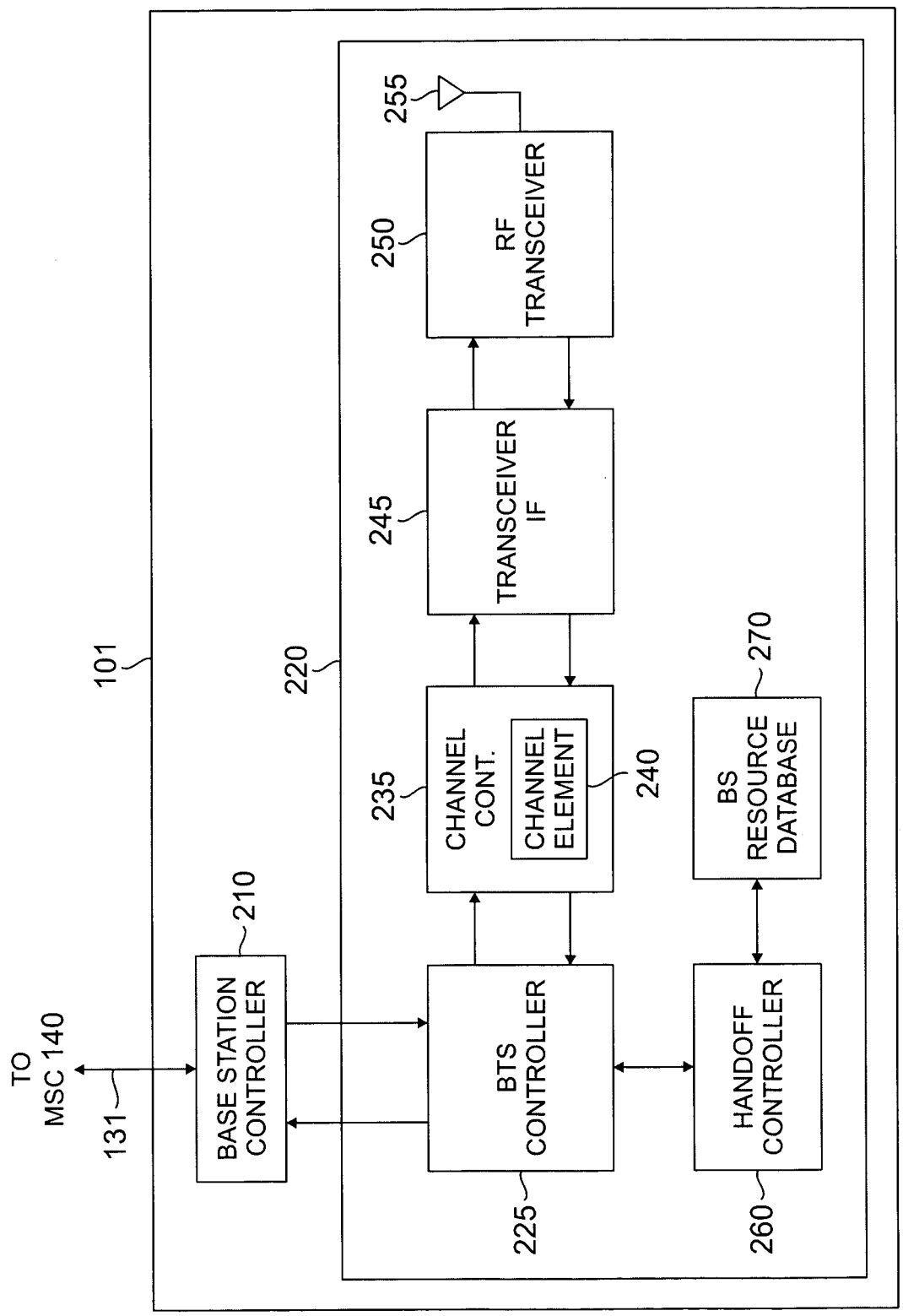
FIG. 2 illustrates in greater detail an exemplary base station that implements an improved handoff algorithm according to the principles of the present invention.

FIG. 2 illustrates in greater detail exemplary base station 101, which implements an improved handoff operation according to the principles of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver unit 250, antenna array 255, handoff controller 260 and base station (BS) resource database 270.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A forward channel refers to outbound signals from the base station to the mobile station and a reverse channel refers to inbound signals from the mobile station to the base station. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

Handoff controller 260 monitors and receives Handoff Request messages that are transmitted to BS 101 by mobile stations that are attempting to autonomously hand off from some other source base station to BS 101. BS Resources database 270 maintains status information regarding all BS 101 resources, including, for example, channel elements, Walsh codes, radio channels, signal processors, and the like. In response to a Handoff Request message, handoff controller 260 analyzes the status of available resources and active resources in base station (BS) resource database 270 and determines whether or not to reject the Handoff Request message from the particular mobile station.

Figure 3:
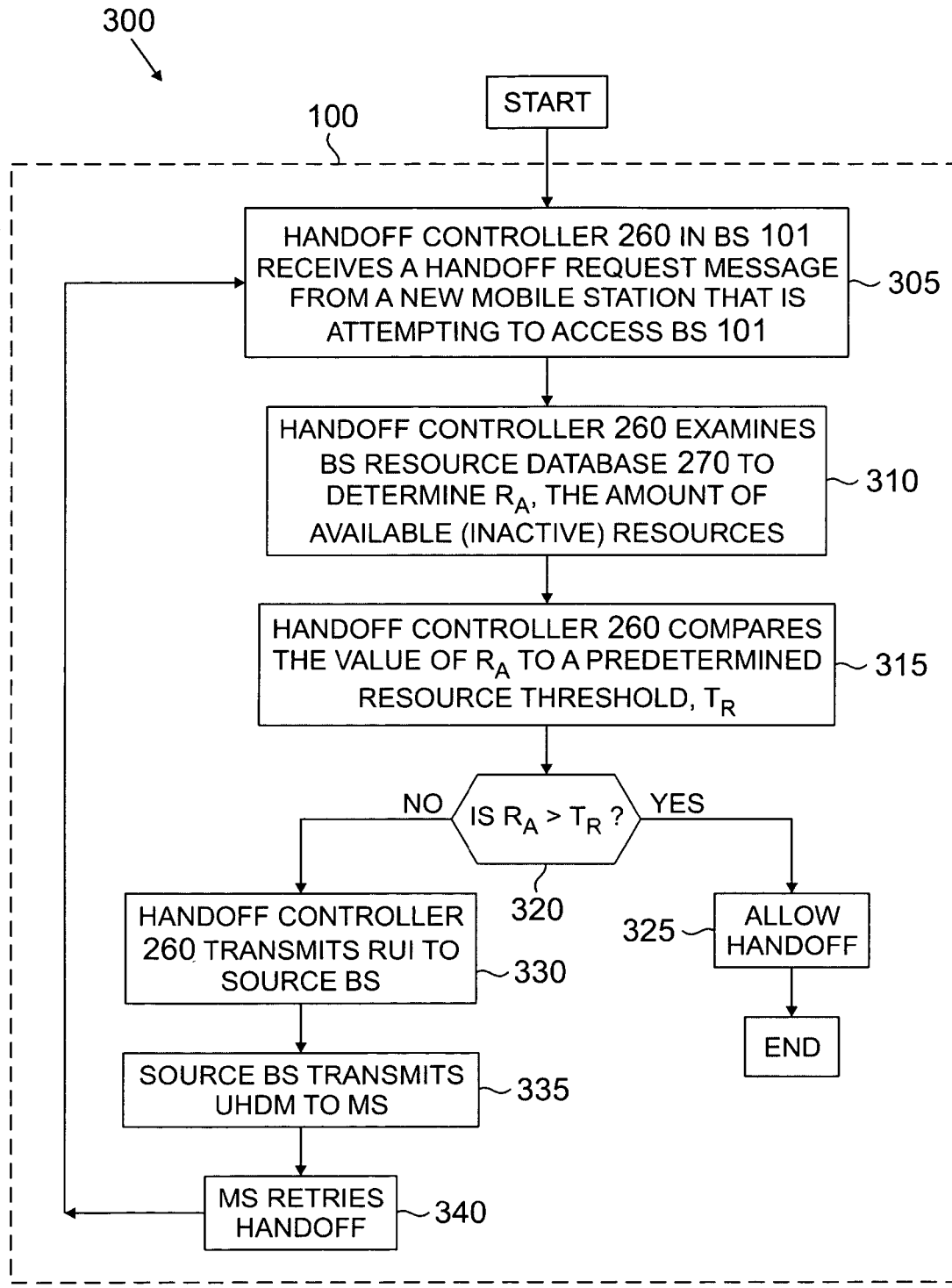
FIG. 3 is a flow diagram illustrating the operation of the exemplary base station in FIG. 2 according to one embodiment of the present invention.

FIG. 3 depicts flow diagram 300, which illustrates the operation of exemplary base station 101 according to one embodiment of the present invention. Initially, base station (BS) 101 is in communication with a number of mobile stations and the status of all BS 101 resources is maintained in BS resource database 270. At some point, handoff controller 260 in BS 101 receives a Handoff Request message from a new mobile station that is attempting to access BS 101 (process step 305). In response to the Handoff Request message, handoff controller 260 examines BS resource database 270 to determine $R_A$, the amount of available (inactive) resources (process step 310).

Next, handoff controller 260 compares the value of $R_A$ to a predetermined resource threshold, $T_R$ (process step 315). The threshold $T_R$ is determined by the wireless network operator and may be programmable. The threshold $T_R$ defines the minimum amount of resources that must be kept available in BS 101 in order to avoid dropped calls and to allow BS 101 to take new calls. If $R_A$ is greater than $T_R$ (Yes branch of process step 320), then sufficient resources are available and handoff controller 260 allows the handoff operation to proceed (process step 325).

If $R_A$ is less than or equal to $T_R$ (No branch of process step 320), then insufficient resources are available. Handoff controller 260 therefore transmits a Resources Unavailable Indicator (RUI) message to the source (or anchor) base station that is currently serving the mobile station (process step 330). In response, the source base station transmits a Universal Handoff Direction message (UHDM) to the accessing mobile station, informing the mobile station that the handoff has been refused (process step 335). Optionally, the source base station may add to the UHDM a delay time value that enables the mobile station to retry the handoff operation after the specified delay time expires (process step 340). Advantageously, the delay time value may be determined by handoff controller 260 in BS 101 in response a determination or prediction regarding the amount of time until sufficient resources will become available in BS 101.

Figure 4:
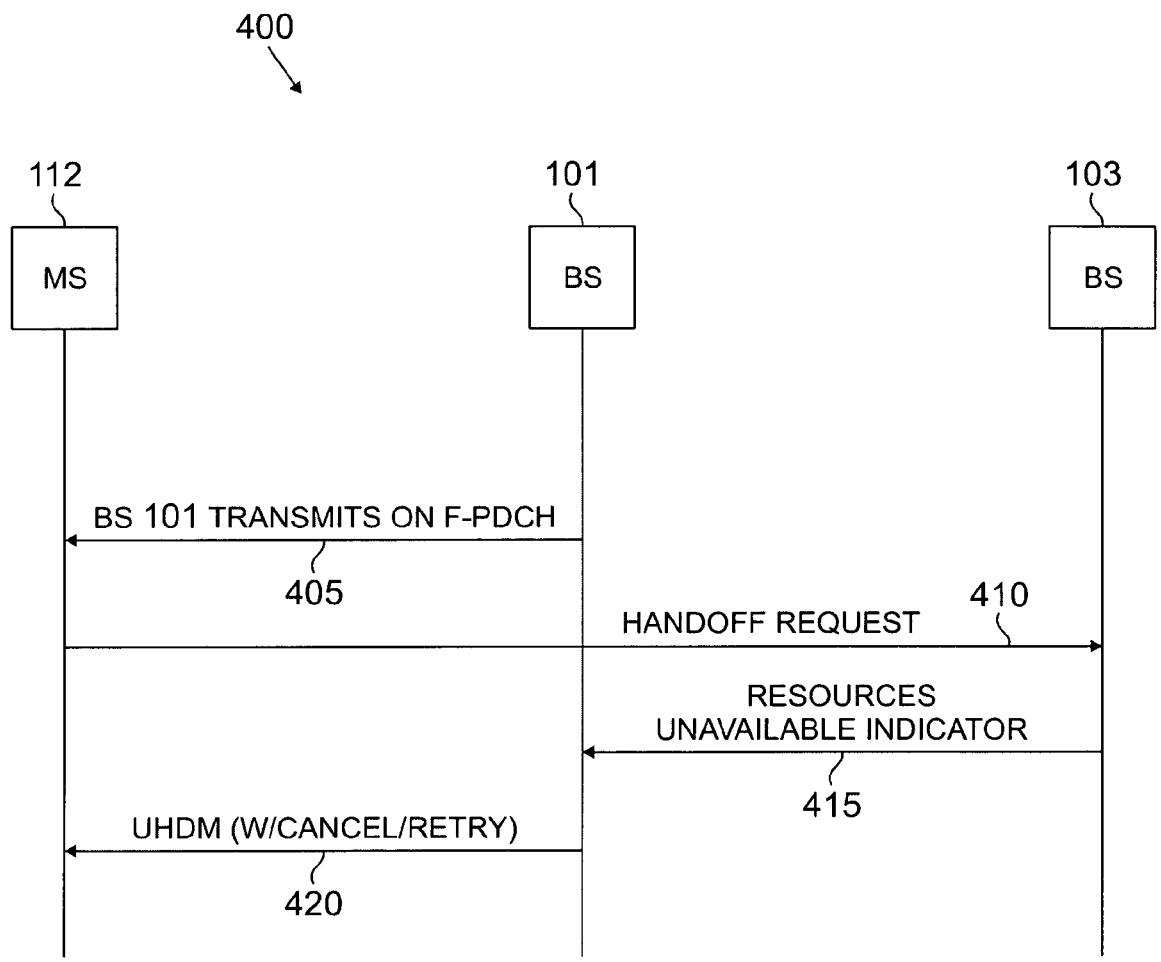
FIG. 4 is a message flow diagram illustrating an improved handoff algorithm according to the principles of the present invention.

FIG. 4 depicts message flow diagram 400, which illustrates an improved handoff algorithm according to the principles of the present invention. In FIG. 4, base station 101 now acts as the source base station. Initially, source (or anchor) base station 101 is assumed to be transmitting packet data message(s) 405 to mobile station 112 on the forward packet data channel (F-PDCH). At some point, when the strength of the pilot signal from target base station 103 becomes greater than the T_ADD threshold, mobile station 112 sends a PSMM message (not shown) to source base station 101 to add the particular pilot signal for target base station (BS) 103 in the active set of mobile station 112.

When mobile station 112 decides to autonomously handoff to the new BS 103 pilot signal in the active set, mobile station 112 transmits Handoff Request (or Cell Switching Request) message 410 to target base station 103. Mobile station 112 sends C/I reports for the NUM_SWITCHING_SLOTS parameter defined by target base station 103 at the end of each 20 millisecond frame. In prior art wireless networks, the mobile station completes the handoff to the target base station after transmitting a pre-determined number of 20 millisecond frames (NUM_SWITCHING_SLOTS).

However, in prior art systems, the target base station cannot reject the Handoff Request by the mobile station. It is possible that the target base station may not be able to allocate sufficient resources to support the handoff. The present invention provides a mechanism that either rejects Handoff Request message 410 or allows mobile station 112 to retry Handoff Request message 410 after a pre-determined time period.

According to the principles of the present, when target base station 103 receives Handoff (or Cell Switching) Request message 410, target base station 103 may reject Handoff Request message 410 by sending Resources Unavailable Indicator message 415 to source base station 101. Resources Unavailable Indicator message 415 indicates that target base station 103 does not currently have the required resources to serve mobile station 112.

In response, source base station 101 sends Universal Handoff Direction message (UHDM) 420 to mobile station 112 to thereby cause mobile station 112 to abandon the current cell switching (handoff) procedure. Source base station 101 also may include in UHDM 420 a new parameter, NUM_SWITCHING_RETRY_DELAY, that enables mobile station 112 to retry the handoff operation after a suitable delay period. It should be noted that the sue of the Universal Handoff direction message is by way of illustration only and should not be construed so as to limit the scope of the present invention. In alternate embodiments of the present invention, the base station may use one or more control channel messages other than UHDM to notify the mobile station to abandon the handoff procedure and to transmit the new parameter that enables the mobile station to retry the handoff operation after a suitable delay period.

The present invention thereby enables the target base station to reject a handoff attempt and/or to allow the mobile station to retry the handoff, if the resources are not available at the target base station. Thus, the prior art problem of unilateral handoff decisions by the mobile station resulting in handoff failures is solved by the message(s) from the target base station to the source base station and the mobile station to either suspend the current cell switching operation or to retry the cell switching operation after a pre-determined delay.

Although the present invention has been described with an exemplary embodiment, various changes and modifications may be suggested to one skilled in the art. It is intended that the present invention encompass such changes and modifications as fall within the scope of the appended claims.

What is claimed is:

1. A first base station in a 1xEV-DV/DO wireless network configured for communication with a plurality of mobile stations in a coverage area of the 1xEV-DV/DO wireless network, the first base station comprising:
a handoff controller configured to:
receive a Handoff Request message from a first mobile station attempting to hand off to the first base station in the 1xEV-DV/DO wireless network;
in response to receipt of the Handoff Request message, determine when an amount of available resources in the first base station exceeds a programmable predetermined minimum threshold;
transmit a delay time value to the first mobile station, the delay time value representing a specified amount of time that the first mobile station is to wait prior to attempting to hand off to the first base station, the delay time determined according to an estimated amount of time that resources will become available, the delay time value based upon the available resource by querying a resource database that comprises a plurality of values relating to the available resources, and wherein each of the available resources corresponds to a predetermined threshold; and
analyze the plurality of available resource values to determine when the available resources exceed the programmable predetermined minimum threshold, wherein the predetermined minimum threshold is the amount of resources required to be kept available to avoid dropped calls and allow the first base station to take new calls.

2. The first base station as set forth in claim 1, wherein the handoff controller is configured to determine the predetermined minimum threshold according to input from an operator of the 1xEV-DV/DO wireless network.

3. The first base station as set forth in claim 1, wherein the handoff controller is configured to, in response to a determination that the amount of available resources exceeds the predetermined minimum threshold, allow the first mobile station to be handed off to the first base station.

4. The first base station as set forth in claim 1, wherein the handoff controller is configured to, in response to a determination that the amount of available resources does not exceed the predetermined minimum threshold, prevent the first mobile station from being handed off to the first base station.

5. The first base station as set forth in claim 4, wherein the handoff controller is configured to prevent the first mobile station from being handed off to the base station by transmitting a control message to a source base station that is in communication with the first mobile station.

6. The first base station as set forth in claim 5, wherein the control message is configured to indicate to the source base station that insufficient resources are available in the first base station.

7. The first base station as set forth in claim 6, wherein the control message is further configured to indicate to the source base station the delay time that the first mobile station must wait before again attempting a handoff to the first base station.

8. The first base station as set forth in claim 7, wherein the control message is configured to cause the source base station to transmit a Universal Handoff direction message to the first mobile station, wherein the Universal Handoff direction message is configured to notify the first mobile station that insufficient resources are available in the first base station and is configured to further notify the first mobile station of the delay time.

9. A 1xEV-DV/DO wireless network comprising:
a plurality of base stations configured to be in communication with a plurality of mobile stations in a coverage area of the 1xEV-DV/DO wireless network, where each of the plurality of base stations comprises:
a handoff controller configured to:
receive a Handoff Request message from a first mobile station in the 1xEV-DV/DO wireless network attempting to hand off to each base station;

in response to receipt of the Handoff Request message, determine when an amount of available resources in each base station exceeds a programmable predetermined minimum threshold;

transmit a delay time value to the first mobile station, the delay time value representing a specified amount of time that the first mobile station is to wait prior to attempting to hand off to the first base station, the delay time determined according to an estimated amount of time that resources will become available, the delay time value based upon the available resource by querying a resource database that comprises a plurality of values relating to the available resources, and wherein each of the available resources corresponds to a predetermined threshold; and analyze the plurality of available resource values to determine when the available resources exceed the programmable predetermined minimum threshold, wherein the predetermined minimum threshold is the amount of resources required to be kept available to avoid dropped calls and allow each of the base stations to take new calls.

10. The 1xEV-DV/DO wireless network as set forth in claim 9, wherein the handoff controller is configured to determine the predetermined minimum threshold according to input from an operator of the 1xEV-DV/DO wireless network.

11. The 1xEV-DV/DO wireless network as set forth in claim 9, wherein the handoff controller is configured to, in response to a determination that the amount of available resources exceeds the predetermined minimum threshold, allow the first mobile station to be handed off to each base station.

12. The 1xEV-DV/DO wireless network as set forth in claim 9, wherein the handoff controller is configured to, in response to a determination that the amount of available resources does not exceed the predetermined minimum threshold, prevent the first mobile station from being handed off to each base station.

13. The 1xEV-DV/DO wireless network as set forth in claim 12, wherein the handoff controller is configured to prevent the first mobile station from being handed off to the base station by transmitting a control message to a source base station that is in communication with the first mobile station.

14. The 1xEV-DV/DO wireless network as set forth in claim 13, wherein the control message is configured to indicate to the source base station that insufficient resources are available in each base station.

15. The 1xEV-DV/DO wireless network as set forth in claim 14, wherein the control message is configured to further indicate to the source base station the delay time that the first mobile station must wait before again attempting a handoff to each base station.

16. The 1xEV-DV/DO wireless network as set forth in claim 15, wherein the control message is configured to cause the source base station to transmit a Universal Handoff direction message to the first mobile station, wherein the Universal Handoff direction message is configured to notify the first mobile station that insufficient resources are available in each base station and is configured to further notify the first mobile station of the delay time.

17. A method of controlling autonomous handoffs by a plurality of base stations in a 1xEV-DV/DO wireless network in communication with a plurality of mobile stations in a coverage area of the 1xEV-DV/DO wireless network, the method comprising:

receiving, by a first base station, a Handoff Request message from a first mobile station in the coverage area of the 1xEV-DV/DO wireless network attempting to hand off to the first base station;

in response to receipt of the Handoff Request message by the first base station, determining when an amount of available resources in the first base station exceeds a programmable predetermined minimum threshold;

transmitting, by the first base station, a delay time value to the first mobile station, the delay time value representing a specified amount of time that the first mobile station is to wait prior to attempting to hand off to the first base station, the delay time value determined according to an estimated amount of time that resources will become available, the delay time value obtained by querying a resource database that comprises a plurality of values relating to the available resources, and wherein each of the available resources corresponds to a predetermined threshold; and analyzing, by the first base station, the plurality of available resource values to determine when the available resources exceed the programmable predetermined minimum threshold, wherein the predetermined minimum threshold is the amount of resources required to be kept available to avoid dropped calls and allow the first base station to take new calls;

when the amount of available resources exceeds the programmable predetermined minimum threshold, allowing, by the first base station, the first mobile station to be handed off to the first base station; and when the amount of available resources does not exceed the programmable predetermined minimum threshold, preventing, by the first base station, the first mobile station from being handed off to the first base station.

18. The method as set forth in claim 17, wherein preventing the first mobile station from being handed off to the base station comprises transmitting a control message to a source base station that is in communication with the first mobile station.

19. The method as set forth in claim 18, wherein the control message indicates to the source base station that insufficient resources are available in the first base station.

20. The method as set forth in claim 19, wherein the control message further indicates to the source base station the delay time that the first mobile station must wait before again attempting a handoff to the first base station.

* * * * *